United States Patent [19]
Ito

[11] Patent Number: 5,297,190
[45] Date of Patent: Mar. 22, 1994

[54] RADIO COMMUNICATION SYSTEM

[75] Inventor: Koichi Ito, Hino, Japan

[73] Assignee: Kabushiki Kaisha Toshiba, Kawasaki, Japan

[21] Appl. No.: 788,270

[22] Filed: Nov. 5, 1991

[30] Foreign Application Priority Data

Nov. 5, 1990 [JP] Japan .................................. 2-299272

[51] Int. Cl.⁵ .......................................... H04M 11/00
[52] U.S. Cl. ........................................ 379/58; 379/59; 379/60
[58] Field of Search ...................... 379/58, 59, 61, 144; 370/94.1; 455/11.1

[56] References Cited

U.S. PATENT DOCUMENTS

| | | | |
|---|---|---|---|
| 4,748,655 | 5/1988 | Thrower et al. ................. | 379/57 X |
| 4,766,000 | 10/1984 | Parienti . | |
| 4,972,506 | 11/1990 | Uddenfeldt ............................ | 379/59 |
| 5,020,054 | 5/1991 | Rash et al. ......................... | 379/59 X |
| 5,042,082 | 8/1991 | Dahlin ................................ | 379/60 |
| 5,109,527 | 4/1992 | Akerberg ............................. | 379/60 |

OTHER PUBLICATIONS

Global News ("Wireless Communication Migrate to the Local Loop"), Oct. 1990.

Primary Examiner—Stephen Chin
Assistant Examiner—Vijay Shankar
Attorney, Agent, or Firm—Finnegan, Henderson, Farabow, Garrett & Dunner

[57] ABSTRACT

A wired line connecting an existing fixed station and a wired telephone network is divided into a plurality of channels on a time division multiplex basis for a digital signal, at least one of the plurality of channels is allocated for a public mobile station, a spatial radio link established between the fixed station and a specific mobile station exclusively connected only to the fixed station is divided into a plurality of time division slots, and at least one of the time slots is used for a public portable radio telephone set.

13 Claims, 18 Drawing Sheets

RADIO COMMUNICATION SYSTEM

BACKGROUND OF THE INVENTION

1. Field of the Invention

The present invention relates to a radio communication system, and more particularly, to a realization of a multiplicity of fixed stations having small spatial radio zones for radio connection of mobile stations.

2. Description of the Related Art

As one of the prior art radio communication systems of the type referred to, there is a portable radio telephone system of a cellular type which arrangement is schematically shown in FIG. 18.

In FIG. 18, a portable telephone control station 201 is connected at its one side to a wired telephone network 202 and also connected at the other side to radio base stations 203-1 to 203-3 as master stations through respective wired lines 206-1 to 206-3. These radio base stations 203-1 to 203-3 have respective spatial radio zones 204-1 to 204-3. When a portable radio telephone set 205 as a mobile station is located within the spatial radio zone 204-2, the portable radio telephone set 205 can communicate with the radio base station 203-2 through the spatial radio circuit and further can communicate with the wired telephone network 202 through the portable telephone control station 201.

If the portable radio telephone set 205 issues a calling signal, then the calling signal issued from the portable radio telephone set 205 is received at any of the respective radio base stations 203-1 to 203-3 even when the portable radio telephone set 205 is located within any of the spatial radio zones 204-1 to 204-3, so that interconnection control between the portable radio telephone set 205 and the wired telephone network 202 is carried out and a communication is started.

FIG. 19 is a block diagram of an internal arrangement of the portable radio telephone set 205, and FIG. 20 is a sequential chart for explaining the brief operation of the portable radio telephone system when a calling signal is issued from the portable radio telephone set.

Explanation will be made as to the case where a calling signal is issued from the portable radio telephone set 205.

First of all, when a hook switch (not shown) of the portable radio telephone set 205 is turned ON, a controller 259 of the portable radio telephone set 205 detects the off-hook state, sets a synthesizer 258 at a frequency of a control channel, and applies to a transmitter 252 a calling signal A including an identification number of the portable radio telephone set 205. And a modulation output of the transmitter 252 is amplified at a power amplifier 253 and then applied through an antenna duplexer 254 to an antenna 255, whereby the calling signal A is transmitted from the antenna.

The radio base station 203-2, when receiving the calling signal A from the portable radio telephone set 205, transmits a calling signal B including identification numbers of the radio base station 203-2 and the portable radio telephone set 205 through the wired line 206-2 to the portable telephone control station 201.

The portable telephone control station 201, when determining that the received identification numbers are for use in its own portable radio telephone system, returns to the radio base station 203-2 a calling answer signal C including the designation of a speech channel while the control station 201 transmits a calling signal D to the wired telephone network 202.

The radio base station 203-2, when receiving the calling answer signal C, transmits a calling answer signal E to the portable radio telephone set 205 through the control channel.

In the portable radio telephone set 205, an input received at the antenna 255 is demodulated at a receiver 256 to form the calling answer signal E which is then applied to the controller 259. This causes a display (not shown) of the portable radio telephone set 205 to indicate thereon a message telling the user of the portable radio telephone set 205 that the user can dial.

Under such a condition, when the user of the portable radio telephone set 205 depresses a dial key (not shown) mounted thereon to enter a desired dial number, this causes the controller 259 to apply a dialing signal F indicative of the dial number to the transmitter 252 to transmit the dialing signal F from the antenna 255.

The radio base station 203-2, when receiving the dialing signal F, transmits a dialing signal G indicative of the dial number to the wired telephone network 202 through the wired line 206-2 and the portable telephone control station 201. As a result, a party telephone set as speech party corresponding to the dial number is called so that, when the speech party answers the calling, the speech can be started. A down voice signal from the wired telephone network 202 is transmitted through the portable telephone control station 201, radio base station 203-2 and a spatial down voice circuit to the portable radio telephone set 205. On the other hand, an up voice signal transmitted from the portable radio telephone set 205 is transmitted through a spatial up voice circuit, the radio base station 203-2 and the portable telephone control station 201 to the wired telephone network 202.

In such a portable radio telephone system, the major problem is the capacity for accommodating the portable radio telephone sets within radio zones. In other words, with the prior art cellular type portable radio telephone system, since the transmission output of the portable radio telephone set is as large as several watts, it has been necessary to set a large distance among each of the radio base stations in order to avoid any interference between the portable radio telephone set and the radio base station using the same frequency. Thus, the number of portable radio telephone sets to be accommodated within the unit area per the entire frequency band allocated to the portable radio telephone system must inevitably be small. This has led disadvantageously to a poor frequency use efficiency.

Two methods for improving the capacity for accommodating portable radio telephone sets have been recently proposed. One method is to set small the transmission outputs of the radio base station and the portable radio telephone set; while the other method is to digitize a voice signal to employ a time division multiple access (TDMA) communication system. When the transmission outputs of the radio base station and portable radio telephone set are set small, that is, when it is desired to secure the same service area as the portable radio telephone system having a large spatial radio zone, this requires the number of radio base stations to be increased, involving an economical problem. Further, unless such a large number of radio base stations are not installed, there occurs such a problem that an unserviceable area is created. In addition, when the number of radio base stations is thoughtlessly increased to solve the aforementioned problems, this also involves other problems such as a scene appearance problem, locations for installation of the system, and in particular, the necessity of an AC power source.

When a voice signal is digitized to employ the time division multiplex access communication system, the frequency band is divided into a predetermined number of time slots as shown in FIG. 21, for example, and speech channels and the time slots are managed in a centralized manner by the portable telephone control station as previously explained above.

In the example of FIG. 21, one frame is divided into 6 time slots (SLOT 1 to SLOT 6) to be repetitively used. Since the frequency band per radio channel can be made to be the same, a frequency effective utilization can be 6 times increased. In other words, 6 times the number of portable radio telephone sets used in the prior art can be used.

In this case, the aforementioned calling answer signals C and E each contains the speech channel number and the number of any one of the 6 time slots and the speech is carried out with use of the designated time slot in the designated speech channel.

Meanwhile, the portable radio telephone system based on the time division multiplex access communication system can digitize a voice signal and can increase relatively easily the number of portable radio telephone sets to be used, but has a limit of increasing the number of portable radio telephone sets. That is, when the number of divided time slots is increased, this requires high-speed data transmission and thus a wide frequency band, which results in that the frequency use efficiency cannot be increased.

On the other hand, as the transmission output or power is made smaller, the capacity for accommodating portable radio telephone sets increases, the consumption current of the portable radio telephone set also decreases, its battery can last longer, and thus the operating time of the portable radio telephone set can be made longer. However, it is difficult to install an increased number of radio base stations efficiently and economically.

SUMMARY OF THE INVENTION

It is therefore an object of the present invention to provide a radio communication system which can eliminate the above problems concerning the installation of the radio base stations and can efficiently improve the capacity for accommodating mobile stations.

The installation problem is that it is difficult to secure a wide service area by providing a lot of small radio zones.

In accordance with the present invention, a wired line between a fixed station (base station (BS) or radio base station) and an exchange network has a plurality of wired communication channels based on the time division of a digital signal like an ISDN line, at least one of the wired communication channels is allocated to a public portable radio telephone set (portable station (PS)), a spatial radio circuit established between the base station and the mobile station is divided into a plurality of time slots on a time division multiplex access (TDMA) basis, at least one of the time slots is used for the public portable radio telephone set, and not only the base station installed outdoors but also a fixed station of a cordless telephone system installed in an ordinary home or office can be used as the fixed station of the portable radio telephone set.

By virtue of this arrangement, the base station installed in an ordinary home, for example, can be used as the master unit of the cordless telephone system and also used as the base station for the public portable station. Consequently, a large number of base stations can be economically and easily installed whereby a wide service area can be secured.

DESCRIPTION OF THE PREFERRED EMBODIMENTS

An embodiment of the present invention will be detailed with reference to the accompanying drawings.

Figure 1:
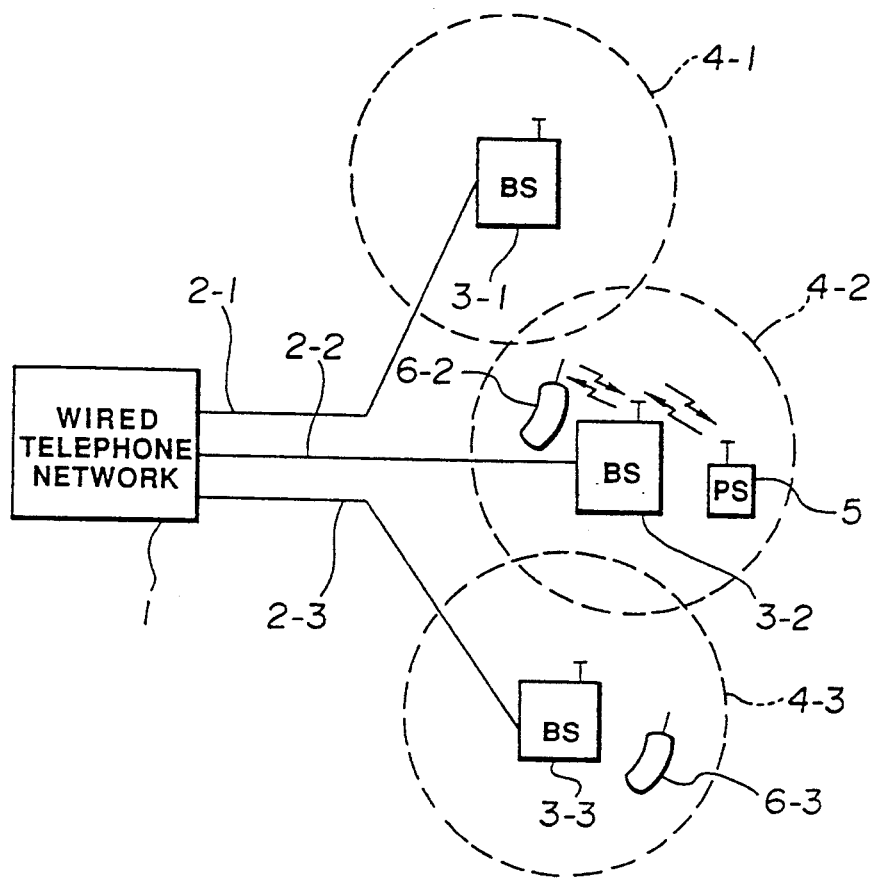
FIG. 1 is a block diagram of a configuration of a radio communication system in accordance with an embodiment of the present invention.
Figure 2:
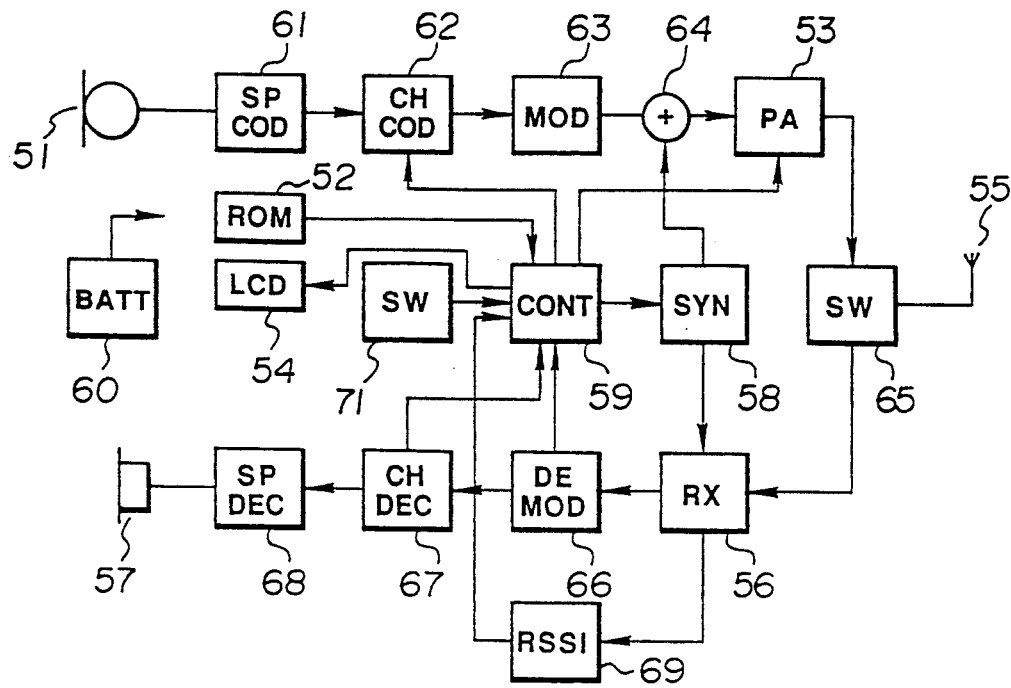
FIG. 2 is a block diagram of an arrangement of a specific branch unit connected to an associated fixed station in the embodiment.
Figure 3:
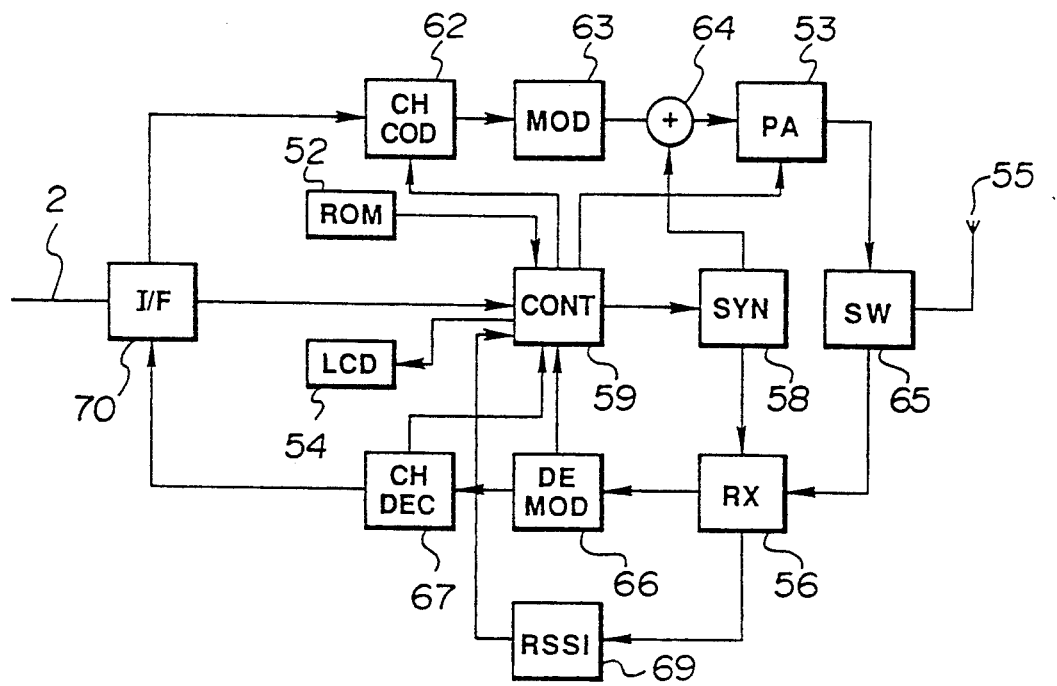
FIG. 3 is a block diagram of an arrangement of the fixed station connected to the branch unit in the embodiment.
Figure 4A:
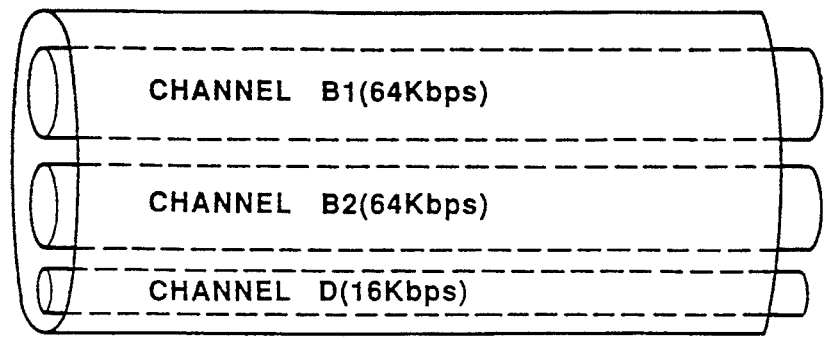
FIGS. 4(a) and 4(b) show digital channels between the fixed station and a wired telephone network in the embodiment.
Figure 4B:
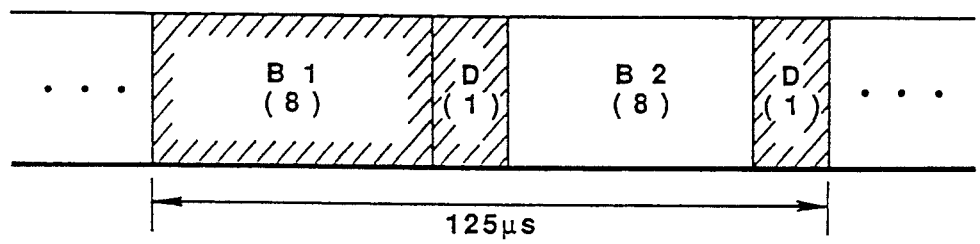
Figure 5A:
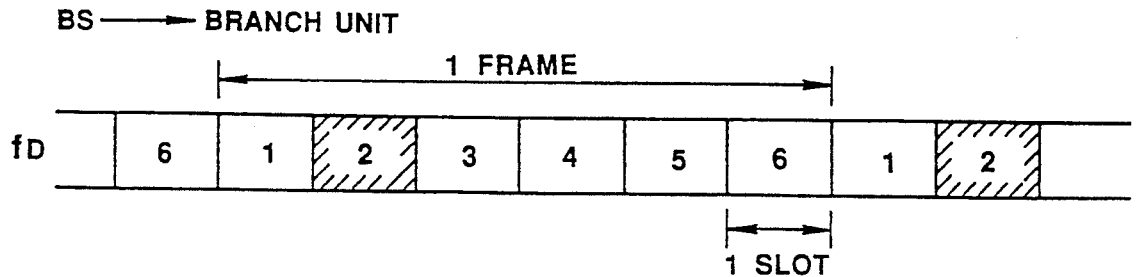
FIGS. 5(a) and 5(b) show diagrams for explaining the operation of the digital channels between the fixed station and the branch unit in the embodiment.
Figure 5B:
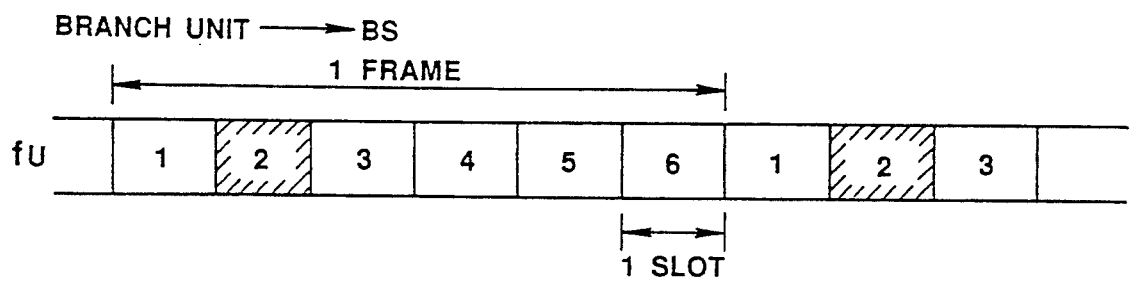
Figure 6:
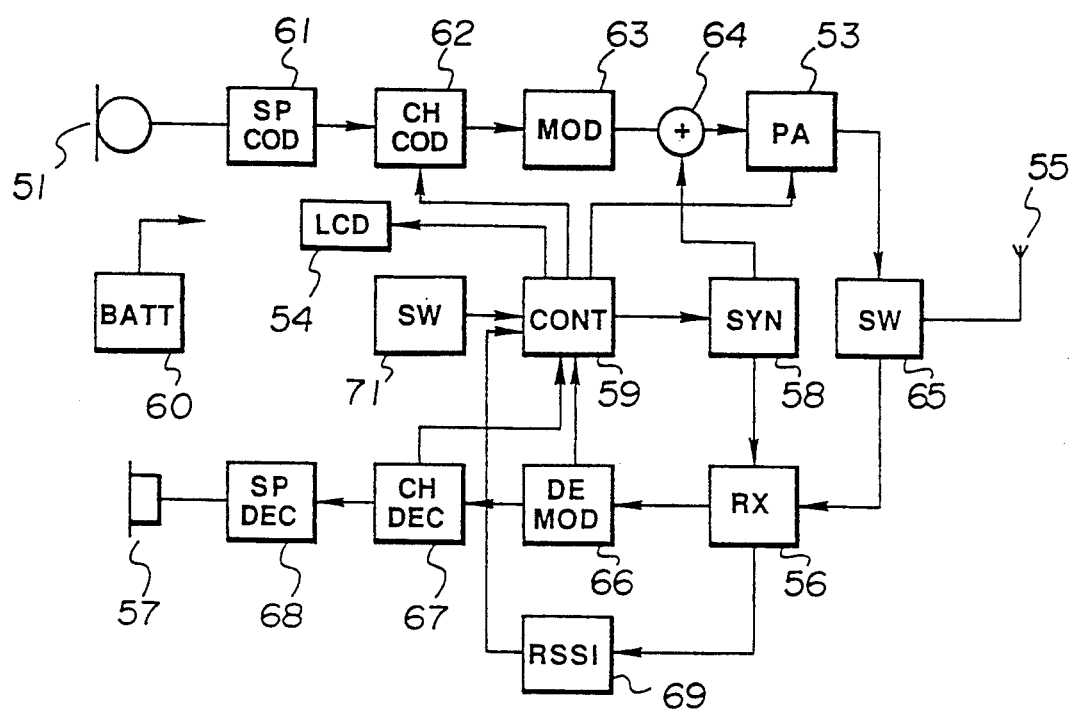
FIG. 6 is a block diagram of an arrangement of a portable radio telephone set in the embodiment.

FIG. 1 is a configuration of a radio communication system in accordance with an embodiment of the present invention, FIG. 2 is a block diagram of an arrangement of a branch unit connected to an associated fixed station in the embodiment, FIG. 3 is a block diagram of an arrangement of a base station (BS) having the branch unit connectable therewith in the embodiment, FIGS. 4(a) and 4(b) show diagrams for explaining the concept of a wired line between the base station and wired telephone network and the schematic structure of the digital channels on the wired line in the embodiment, FIGS. 5(a) and 5(b) show a digital channel structure on a spatial radio circuit between the base station and the branch unit in the embodiment, and FIG. 6 is a block diagram of an arrangement of a portable station (PS) 5, respectively.

The system of FIG. 1 includes a wired telephone network 1, ISDN lines 2-1 to 2-3, base stations (BSs) 3-1 to 3-3, spatial radio zones 4-1 to 4-3, a portable station (PS) 5, and branch units 6-2 and 6-3 corresponding to the base stations 3-2 and 3-3 respectively.

In the illustrated example, the base stations 3-2 and 3-3 each comprise a master unit in a cordless telephone system installed at an ordinary home and also used as the master units of the branch units respectively. Although one branch unit is provided for each base station in the present embodiment, a plurality of branch units may be provided for each base station as necessary.

The base station 3-1 is installed especially outdoors for the exclusive service of public portable stations. That is, such a base station is provided to expand the service area, e.g., to such a region where no house is built.

Accordingly, the portable station 5 can receive its radio telephone service when located within any one of the spatial radio zones 4-1 to 4-3, that is, the portable station 5 is connected to the wired telephone network 1 through one of the base stations 3-1 to 3-3 within which the portable station 5 is located and through associated one of the ISDN lines. Meanwhile, the branch units 6-2 and 6-3 are connected to the wired telephone network 1 only through the specific base stations 3-2 and 3-3 as their own master units and through the ISDN lines 2-2 and 2-3 respectively. As a result, the branch unit 6-2 for example, will not be connected to the wired telephone network 1 through the base stations 3-1 and 3-3.

Explanation will next be made as to the detailed arrangement of a branch unit shown in FIG. 2. First, analog voice signal issued from a handset transmitter 51 is converted at a voice coder (SPCOD) 61 into a digital voice signal. The digital voice signal is then converted at an error correcting coder (CHCOD) 62 into an error-corrected digital voice signal. The error-corrected digital voice signal is further converted at a digital modulator (MOD) 63 into a modulation signal that is then added at an adder circuit 64 to an output of a synthesizer (SYN) 58 to have a predetermined radio channel frequency. The output of the adder 64 is amplified at a power amplifier (PA) 53 up to a predetermined transmission power. In the present communication system, the power amplifier 53 is operated only for the allocated transmission time slot of the transmission frequency and the synthesizer 58 also outputs the frequency necessary for the transmission in the transmission time slot. A control data signal necessary for the establishment of a spatial radio circuit is generated from a controller (CONT) 59, applied to the error correcting coder 62 and transmitted in the same manner as for the voice signal.

In a reception time slot of the allocated receive frequency, on the other hand, a receive signal received at an antenna 55 and subjected at a receiver (RX) 56 to a frequency conversion is subjected at a digital demodulator (DEMOD) 66 to a bit and frame synchronization to obtain a synchronized signal. The synchronized signal is sent from the demodulator 66 to the controller 59. A demodulated signal of the demodulator 66 is applied to an error correcting decoder (CHDEC) 67. In the error correcting decoder 67, the digital voice signal or control data signal subjected to the error correction coding is decoded into the original digital voice signal or control data signal which is not subjected to the error correction coding. The digital voice signal is further decoded at a voice decoder (SPDEC) 68 and output from a handset receiver 57 as an analog voice signal. The decoded control data signal of the error correcting decoder 67 is sent to the controller 59 to be read as a control data thereat.

A battery 60 is used as the power source of the portable station and a receive electric-field intensity detecting circuit (RSSI) 69 is used to detect whether a receive electric-field intensity was reduced in the speech communication. A memory (ROM) 52 is provided to store therein an ID code for designating the corresponding base station, and a display (LCD) 54 is to display thereon various sorts of data necessary for the speech processing.

Shown in FIG. 3 is the detailed arrangement of the base station 3-2 to be connected to the branch unit 6-2 through a spatial radio circuit. In the drawing, parts having the same functions as those of the portable station 5 of FIG. 2 are denoted by the same reference numerals for convenience of explanation.

The digitized voice signal is subjected not to an analog voice signal conversion but to a protocol conversion at an ISDN user/network interface circuit 70 and then connected to the ISDN line 2 (2-1 to 2-3). That is, the ISDN user/network interface circuit 70 acts to perform a mutual conversion between the control data of the ISDN line 2 and the control data of the base station and also to perform a conversion between the transmitted and received digital voice signal and the channel format of the ISDN line.

FIG. 4(a) conceptionally shows the ISDN line between the base station and the wired telephone network, and FIG. 4(b) shows the schematic arrangement of the digital channels on the ISDN line. As will be seen from FIG. 4, the ISDN user/network interface circuit 70 comprises a basic interface of 2B and D channels in the present embodiment. That is, the ISDN user/network interface circuit 70 uses two channels of channels B1 and B2 as digital channels and one control channel D. Each of the channels B1 and B2 has a data transmission rate of 64 kbps and the channel D has a data transmission rate of 16 kbps. Data signals on the channels B1, B2 and D in FIG. 4(a), which correspond to B1, B2 and D in FIG. 4(b) and are arranged in such a time series manner as shown in FIG. 4(b), are transmitted and received between the base station and the wired telephone network. In FIG. 4(b), numbers in parentheses each denote the number of bits and the ISDN user/network interface circuit 70 performs such a protocol conversion as to add or remove a frame synchronization bit, a DC balancing bit, etc.

FIGS. 5(a) and 5(b) show the digital channel structure of the radio circuit between the base station and the branch unit. In FIG. 5, a down line frequency $f_D$ (FIG. 5(a)) from the base station to the branch unit is combined with an up line frequency $f_U$ (FIG. 5(b)) from the branch unit to the base station to allocate the time slot "2" of the radio channel, that is, the hatched time slot is being used, i.e., in a speech.

The number of time slots is set to have a multiplexing number of 6 in FIG. 5, but any multiplexing number of at least 2 may be employed to realize the present invention.

Shown in FIG. 6 is the arrangement of the portable station 5, which has substantially the same arrangement as the branch unit 6-2 or 6-3 of FIG. 2, except that the branch units 6-2 and 6-3 have specific ID codes with respect to their own base stations 3-2 and 3-3 respectively but the portable station 5 of FIG. 6 has no such an ID code. In other words, the portable station of 5 of FIG. 6 has no such a memory (ROM) 52 storing the ID code of the branch unit 6-2 or 6-3 as shown in FIG. 2. Meanwhile, the portable station 5 of FIG. 6, which is not restricted by a single fixed radio zone, eliminates the need for especially distinguishing between the fixed stations. In FIG. 6, parts having the same functions as those of the branch unit 6-2 or 6-3 in FIG. 2 are denoted by the same reference numerals and detailed explanation thereof is omitted for convenience of explanation.

First, explanation will be made as to the connecting procedure between the base station 3-2 or 3-3 and the branch unit 6-2 or 6-3 through a spatial radio circuit in the present embodiment.

Figure 7:
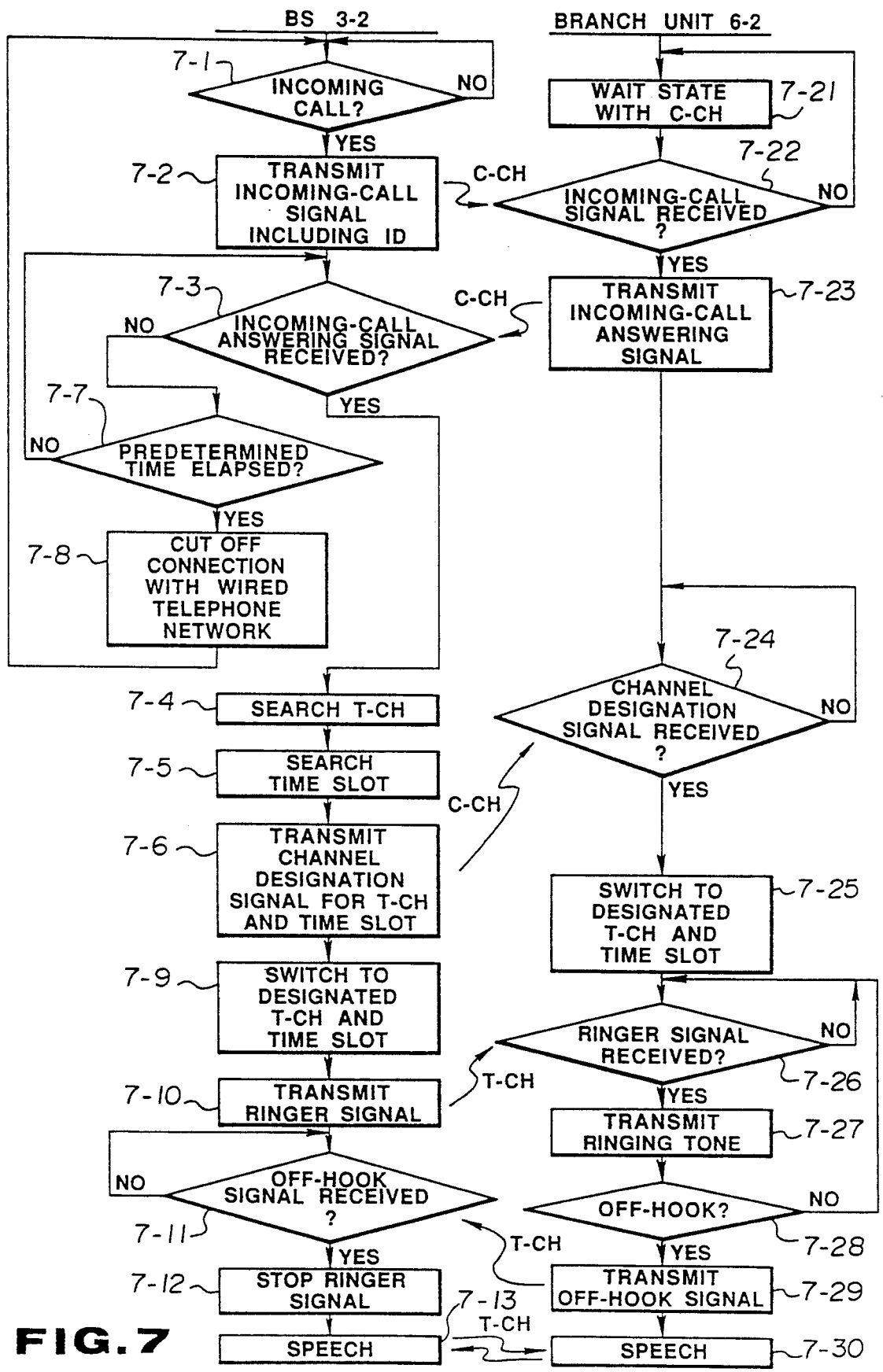
FIG. 7 is a flowchart for explaining the operation of the fixed station and the specific branch unit when the fixed station having the branch unit receives an incoming call.

FIG. 7 shows the connecting procedure between the base station 3-2 and the branch unit 6-2 through a spatial radio circuit when the base station 3-2 receives an incoming call from the wired telephone network 1. In FIG. 7, the base station 3-2 judges whether an incoming call signal has been received from the wired telephone network 1 through the channel D of the ISDN line 2-2 (step 7-1). The base station 3-2, when determining no reception of the incoming call signal, cannot go to the next step. When the base station determines the reception of the incoming call signal, the controller 59 of the base station 3-2 reads an ID from the memory 52 and the base station 3-2 transmits an incoming call signal containing the ID to the branch unit 6-2 through the control channel (which will be referred to merely as the C-CH, hereinafter) (step 7-2).

Meanwhile, the branch unit 6-2 is in its wait state on the C-CH (step 7-21). The branch unit 6-2, when receiving the incoming call signal from the base station 3-2, collates the ID of the received incoming call signal with the ID stored in the memory 52 in FIG. 2 to judge whether or not the incoming call signal is directed to the branch unit 6-2 (step 7-22). The branch unit 6-2, when determining that the incoming call signal is directed to the branch unit 6-2, transmits an incoming-call answer signal to the base station 3-2 through the C-CH (step 7-23).

The base station 3-2 judges whether the incoming-call answer signal has been received on the C-CH (step 7-3). When the base station 3-2 determines the reception of the incoming-call answer signal from the branch unit 6-2, the controller 59 of the base station 3-2 sequentially switches the transmission frequency of the synthesizer 58 to search the speech or talk channel (which will be referred to merely as the T-CH, hereinafter) (step 7-4). The controller 59 further searches the use state of the time slots of the searched T-CH (step 7-5). On the basis of the results of the T-CH search and the time slot search, the base station 3-2 transmits through the C-CH a channel designation signal including the T-CH designation and the time slot designation (step 7-6). And the controller 59 controls the synthesizer 58, the power amplifier 53 and the receiver 56 to switch to the designated T-CH and time slot (step 7-9). The base station 3-2, when failing to receive the incoming-call answer signal from the branch unit 6-2 even after the passage of a predetermined time (step 7-7), cuts off the connection with the wired telephone network 1 (step 7-8). When the switching to the designated T-CH and time slot in the step 7-9 is completed, the base station 3-2 transmits a ringer signal to the branch unit 6-2 with the switched T-CH and time slot (step 7-10).

The branch unit 6-2, after transmitting the incoming call signal to the base station 3-2, judges whether to have received the channel designation signal (step 7-24). When the branch unit 6-2 receives the channel designation signal, the controller 59 of the branch unit 6-2 controls the synthesizer 58, the power amplifier 53 and the receiver 56 to switch to the designated T-CH and time slot (step 7-25). Thereafter, the branch unit 6-2 judges whether to have received the ringer signal with the switched T-CH and time slot (step 7-26). When the branch unit 6-2 determines the reception of the ringer signal with switched T-CH and time slot, the controller 59 transmits a ringing tone from a loudspeaker (not shown) (7-27). In response to the ringing tone, the user of the branch unit 6-2 takes the unit off-hook (step 7-28), the branch unit 6-2 transmits an off-hook signal on the T-CH to the base station 3-2 (step 7-29).

After having transmitted the ringer signal, the base station 3-2 responsive to the reception of the off-hook signal (step 7-11) stops the transmission of the ringer signal (step 7-12). At this stage, the branch unit 6-2 gets ready for a speech or talk with the caller party connected to the other end of the wired telephone network 1, through the base station 3-2 with use of the channel B1 of the ISDN line 2-2 and the designated T-CH and time slot (steps 7-13 and 7-30).

Figure 8:
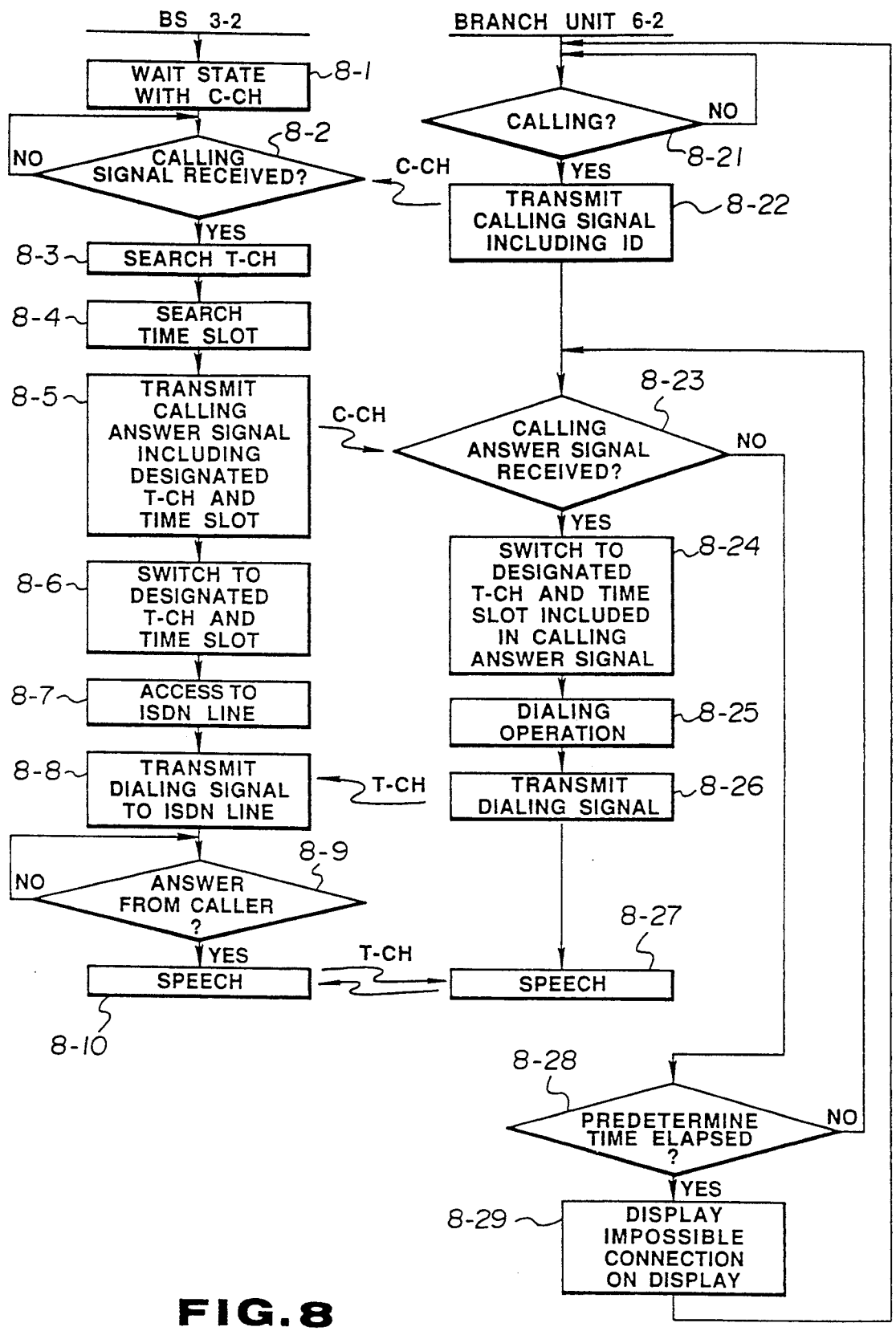
FIG. 8 is a flowchart for explaining the operation of the fixed station and the branch unit connected to the fixed station when the branch unit issues a calling signal.

Explanation will then made as to the connecting procedure between the base station 3-2 and the branch unit 6-2 when the branch unit 6-2 issues a call request, by referring to FIG. 8.

First, the branch unit 6-2 judges whether or not the operator of the branch unit 6-2 conducted a calling operation (step 8-21). The determination of the presence of a calling operation causes the branch unit 6-2 to read out its own ID from the ROM 52 and to transmit a calling signal including the read ID to the base station 3-2 (step 8-22).

The base station 3-2 in its wait state with the C-CH (step 8-1), when receiving the calling signal from the branch unit 6-2 (step 8-2), the controller 59 of the base station 3-2 sequentially switches the transmission frequency of the synthesizer 58 to search the T-CH (step 8-3) and further search the use state of the time slots of the searched T-CH (step 8-4). On the basis of the results of the T-CH search and time slot search, the base station 3-2 transmits a channel designation signal including the T-CH designation and time slot designation to the branch unit 6-2 (step 8-5). Further, the controller 59 of the base station 3-2 controls the synthesizer 58, the power amplifier 53 and the receiver 56 to switch to the designated T-CH and time slot (step 8-6). Then, the base station 3-2 transmits the calling signal through the channel D of the ISDN line 2-2 to access to the wired telephone network 1 (step 8-7).

After having transmitted the calling signal, the branch unit 6-2, when receiving the calling answer signal (channel designation signal) from the base station 3-2 (step 8-23), the controller 59 of the branch unit 6-2 controls the synthesizer 58, the power amplifier 53 and the receiver 56 to switch to the designated T-CH and time slot (step 8-24). When the branch unit 6-2 waits for the reception of the calling answer signal for a predetermined time but fails to receive the calling answer signal even after the passage of the predetermined time (step 8-28), the branch unit 6-2 displays a message indicative of a connection failure on the display (LCD) 54 (step 8-29). When branch unit 6-2 receives the calling answer signal in the step 8-23 and completes the switching to the designated T-CH and time slot in the step 8-24, a depressing operation of a dial number key (not shown) by the operator of the branch unit (step 8-25) causes the branch unit 6-2 to transmit a dialing signal to the base station 3-2 with use of the designated T-CH and time slot (step 8-26).

Meanwhile, the base station 3-2, when receiving the dialing signal from the branch unit 6-2, transmits a dialing signal to the wired telephone network 1 through the ISDN line 2-2 (step 8-8).

Thereafter, when a party as a call receiver connected to the other end of the wired telephone network gives an off-hook as an answer from the call receiver and the base station 3-2 receives the off-hook signal from the call receiver through the wired telephone network 1 and the ISDN line 2-2 (step 8-9), the party and the caller are put in their speech state (steps 8-10 and 8-27).

As a result, the branch unit 6-2 as a caller can talk with the party as the call receiver connected to the other end of the wired telephone network 1 through the B-1 channel of the ISDN line 2-2, BS3-2 and the designated time slot of the designated T-CH (step 8-27).

Although explanation has been made as to the operations of the base station 3-2 and the branch unit 6-2, the same explanation holds true even for the base station 3-3 and the branch unit 6-3.

The connecting procedure between the portable station 5 and the base stations 3-1, 3-2 and 3-3 will now be explained.

Figure 9:
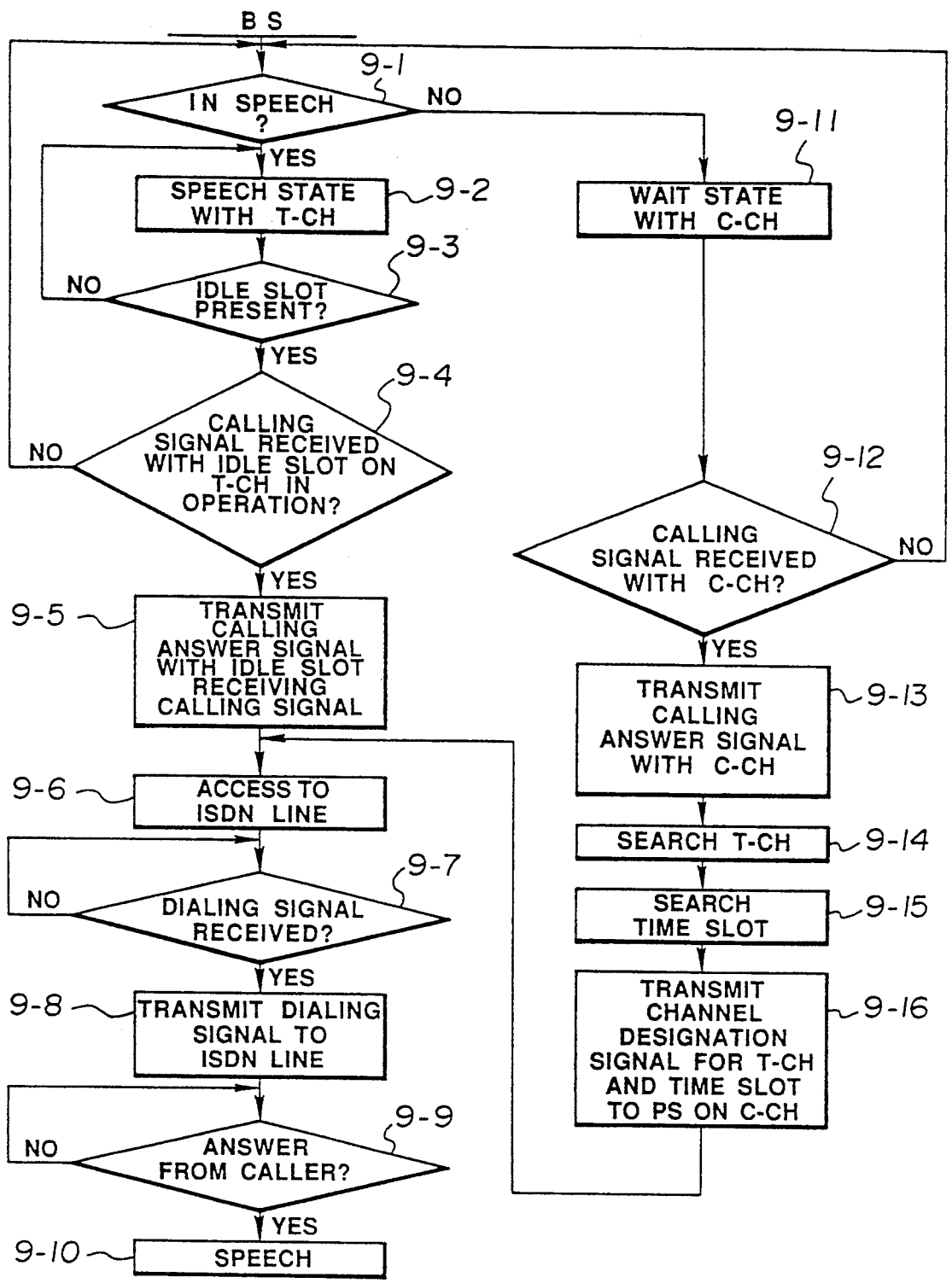
FIG. 9 is a flowchart for explaining the transmission/answering operation of the fixed station when the portable radio telephone set issues the calling signal.
Figure 10:
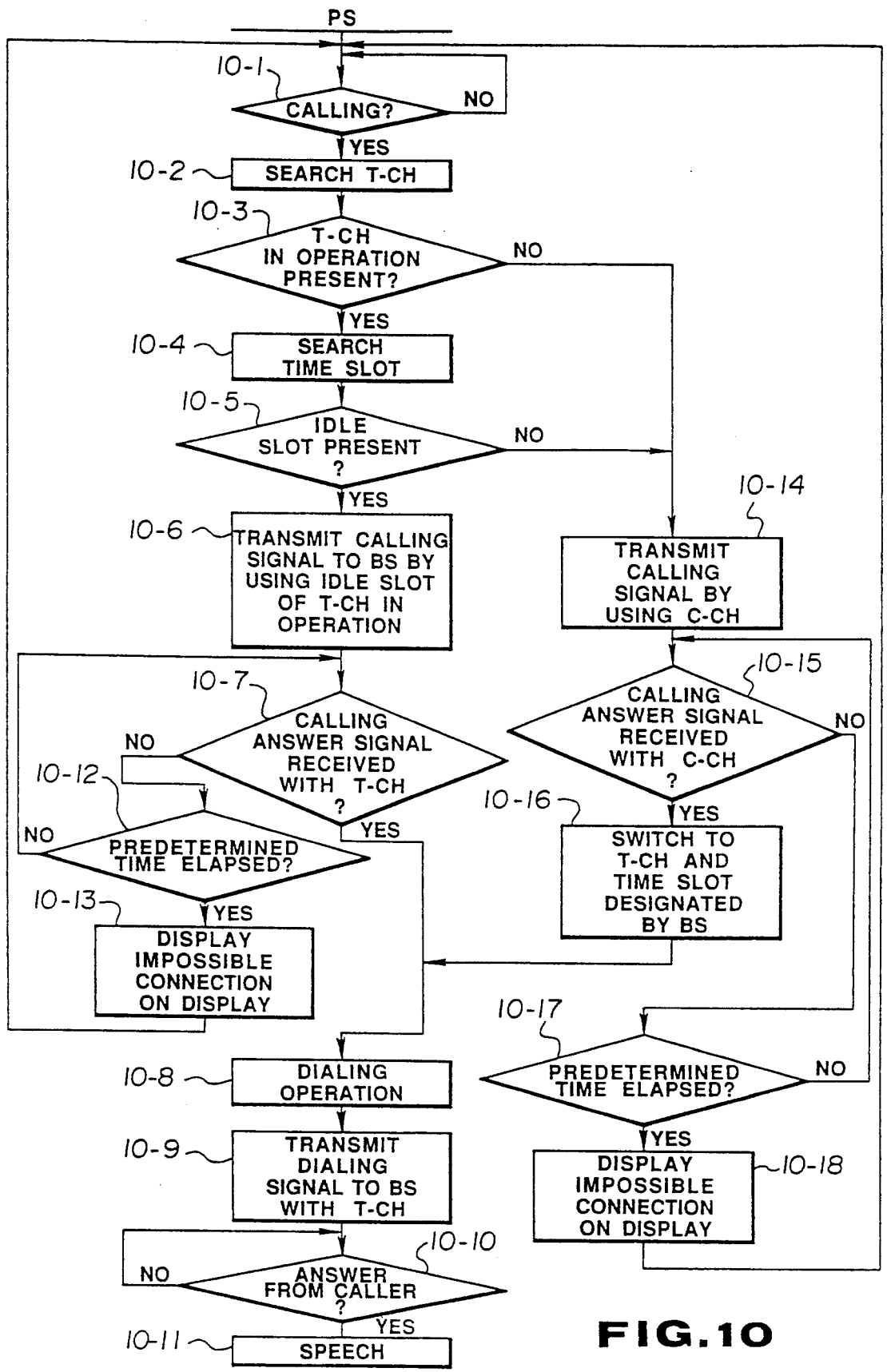
FIG. 10 is a flowchart for explaining the transmission operation of the portable radio telephone set.

Referring to FIG. 9, there is shown a flowchart for explaining the call answering operation of the base station 3-2 or 3-3 with respect to a calling signal issued from the portable station 5.

With respect to the calling signal from the portable station 5, there are considered roughly two cases where the base station 3-2 or 3-3 is in its speech mode, that is, the branch unit 6-2 or 6-3 corresponding to the base station 3-2 or 3-3 is in its speech mode and where the branch unit is not in the speech mode (step 9-1).

In the case where the base station 3-2 or 3-3 is in the speech mode, the base station is in the speech mode on the T-CH (step 9-2). When there is no idle slot in the T-CH, the base station cannot go to the next step. When there is an idle slot, the base station proceeds to the next step (step 9-3). More specifically, when there is an idle slot in the T-CH being used in the speech, the base station judges the reception or non-reception of the calling signal with use of the idle slot (step 9-4). In the case of the presence of an idle slot in the T-CH being used for the speech, the base station judges whether or not to have received the calling signal with use of the idle slot (step 9-4). The base station, when receiving the calling signal, returns a calling answer signal to the portable station 5 with use of the idle slot of the T-CH (step 9-5). Further, the base station transmits the calling signal to the wired telephone network 1 with use of the channel D of the ISDN line 2-2 or 2-3 to access the ISDN line (step 9-6).

After this, the base station, when receiving a dialing signal from the portable station 5 (step 9-7), transmits the dialing signal to the wired telephone network 1 through the ISDN line 2-2 or 2-3 (step 9-8). Further, when receiving an answer from the call receiver connected to the other end of the wired telephone network 1 (step 9-9), the base station is put in its speech mode (step 9-10).

In the case where the base station 3-2 or 3-3 is not in the speech mode, on the other hand, the base station is in its wait state with the C-CH (step 9-11). Thereafter, the base station in the wait mode with the C-CH, when receiving the calling signal from the portable station 5 (9-12), transmits a calling answer signal with use of the C-CH to the portable station 5 (step 9-13). And the base station searches a T-CH for use in the speech (step 9-14) and further searches the time slots of the T-CH (step 9-15). Then, on the basis of the T-CH search and time slot search, the base station transmits to the portable station 5 a channel designation signal for designating the T-CH and time slot (step 9-16).

The subsequent operation is substantially the same as the operation procedure when the base station 3-2 or 3-3 is in the speech mode with the party. That is, the base station accesses the wired telephone network 1 with use of the channel D of the ISDN line 2-2 or 2-3 (step 9-6). Thereafter, the base station, when receiving the dialing signal from the portable station 5 (step 9-7), transmits the dialing signal to the wired telephone network 1 through the ISDN line (step 9-8). When receiving an answer from the call receiver connected to the other end of the wired telephone network (step 9-9), the base station is put in its speech mode (step 9-10).

Explanation will next be made as to the connecting procedure of the portable station 5 from the transmission of a calling signal to the speech mode. First, the portable station 5 judges the presence or absence of a calling operation by the user of the portable station 5 (step 10-1). When determining the presence of a calling operation, the portable station 5 performs its T-CH searching operation (step 10-2). When finding a T-CH in operation through the T-CH searching operation (step 10-3), the portable station 5 further performs its time slot searching operation (step 10-4). The presence of an idle slot causes the portable station 5 to transmit a calling signal to the base station 3-2 or 3-3 (step 10-6).

When failing to detect a T-CH in use as the T-CH search result (step 10-3) or when detecting a T-CH in use but failing to find an idle slot in the T-CH in use (step 10-5), the portable station 5, the portable station 5 transmits the calling signal to the base station 3-2 or 3-3 (step 10-14). The now operational procedure will be explained later.

After having transmitted the calling signal with use of the T-CH, the portable station 5, when receiving a calling answer signal from the base station 3-2 or 3-3 (step 10-7), the portable station 5 transmits a dialing signal to the base station 3-2 or 3-3 with use of the T-CH through user's dialing operation (step 10-8) (step 10-9). Thereafter, the portable station 5, when receiving an answer from the call receiver (step 10-10), can talk with the party of the call receiver (step 10-11). When failing to receive the calling answer signal from the base station in a predetermined time with use of the T-CH (step 10-12), the portable station 5 displays a message indicating a connection failure on the display (LCD) 54 (step 10-13).

When having transmitted the calling signal to the base station 3-2 or 3-3 with use of the C-CH in a step 10-14, the portable station 5 waits for reception of the calling answer signal from the base station 3-2 or 3-3 with use of the C-CH. The portable station 5, when receiving the calling answer signal (step 10-15), switches the current T-CH and time slot to the designated T-CH and time slot contained in the calling answer signal (step 10-16). When failing to receive the calling answer signal in the predetermined time (step 10-17), the portable station 5 displays a message indicating a connection failure on the display (LCD) 54 (step 10-18).

The operation after the completion of the switching to the designated T-CH and time slot in the step 10-16 is substantially the same as the aforementioned transmission of the calling signal with the T-CH. The portable station 5 transmits the dialing signal to the base station on the T-CH through user's dialing operation (step 10-8) (step 10-9). After this, the portable station 5, when receiving an answer from the call receiver (step 10-10), can talk with the part as the call receiver (step 10-11).

Although the connecting procedure between the base station 3-2 or 3-3 and the portable station 5 has been explained in the foregoing, the same explanation holds true for the connection control procedure between the base station 3-1 and the portable station 5, except that the base station 3-1 not having the corresponding branch unit will not put in a speech mode unlike the other base stations which are put in their speech mode by using the corresponding branch units. However, when another portable station is present, the base station 3-1 may be put in the speech mode by using the other portable station.

A brief explanation will now be directed to the relative operation between the base station 3-1 to 3-3 and the portable station 5 with respect to the current position of the portable station 5 and its speech state.

Figure 11:
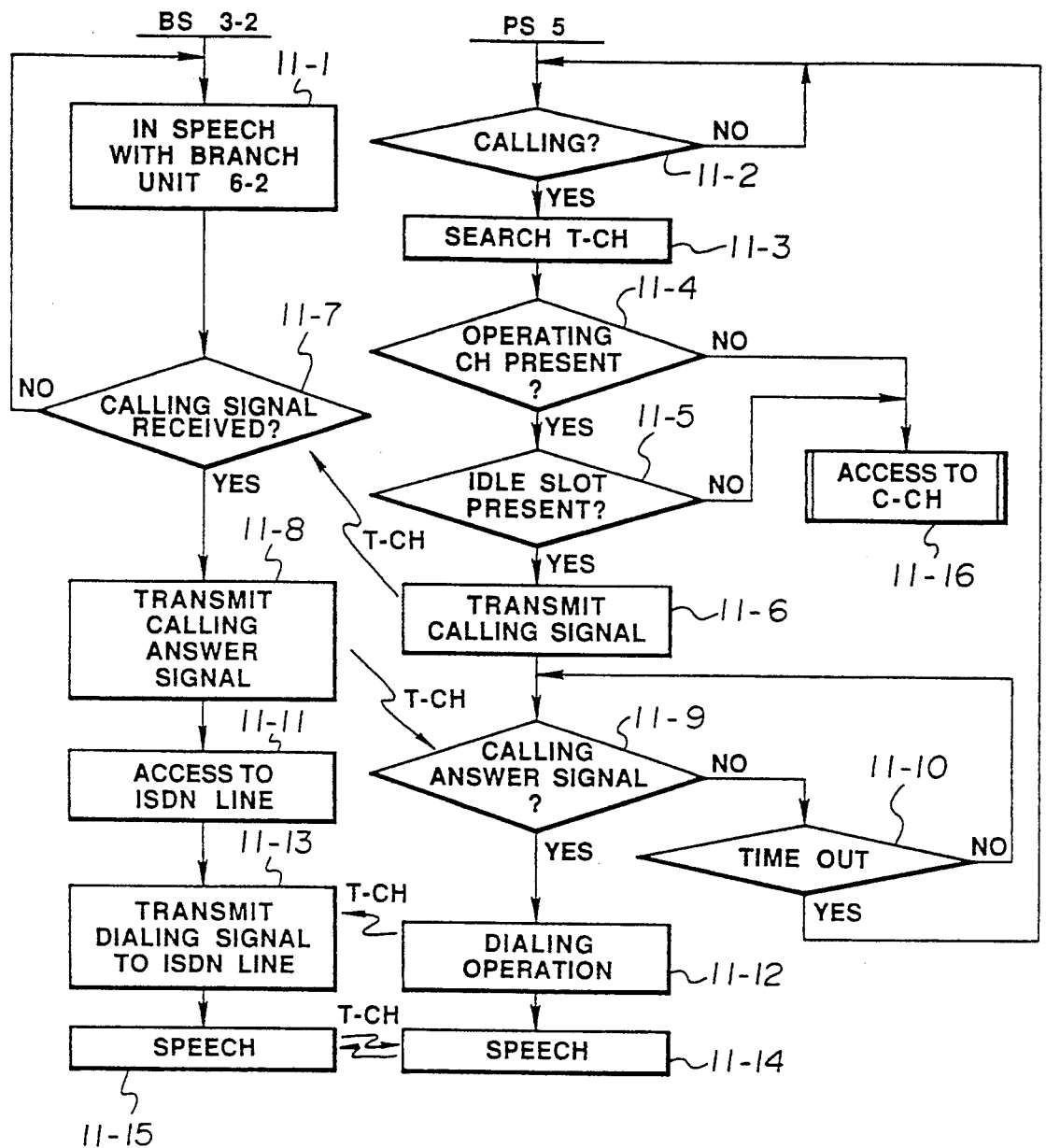
FIG. 11 is a flowchart for explaining the general relative operation between the portable radio telephone set and the fixed station when the portable radio telephone set issues the calling signal.

First, explanation will be made as to the operations of the base station 3-2 and the portable station 5 when the portable station 5 is located within the spatial radio zone 4-2 as shown in FIG. 1 and the branch unit 6-2 associated with the base station 3-2 is in the speech mode, by referring to a flowchart of FIG. 11.

While the base station 3-2 having the spatial radio zone 4-2 is talking with the specific branch until 6-2 with use of the T-CH (step 11-1), when the portable station 5 located within the spatial radio zone 4-2 issues a calling signal through user's calling operation (step 11-2), the portable station 5 performs its T-CH searching operation (step 11-3) and then on the basis of the T-CH search result, judges the presence or absence of a T-CH in operation (11-4). In this case, since the base station 3-2 is talking with use of the T-CH, the portable station 5 detects the T-CH. Further, the portable station 5 performs its time slot searching operation of the associated T-CH to judge the presence or absence of an idle slot (step 11-5). The presence of an idle slot causes the portable station 5 to transmit the calling signal to the base station 3-2 with use of the idle slot of the T-CH being used (step 11-6).

Meanwhile, the base station 3-2, when an idle sot is present in the T-CH being used, also receives the idle slot and judges the reception or non-reception of the calling signal from the portable station 5 (step 11-7). The base station 3-2, when receiving the calling signal from the portable station 5, returns a calling answer signal to the portable station 5 with use of the idle slot of the T-CH (step 11-8). Thereafter, the base station 3-2 accesses the ISDN line 2-2 to transmit the calling signal to the wired telephone network 1 (step 11-11).

The portable station 5, after transmitting the calling signal, judges the reception or non-reception of the calling answer signal from the base station 3-2 (step 11-9). When receiving the calling answer signal in a predetermined time (step 11-10), the portable station 5 transmits a dialing signal entered through a user's dialing operation with use of the idle time slot of the T-CH (step 11-12).

The base station 3-2, when receiving the dialing signal from the portable station 5, transmits the dialing signal to the wired telephone network 1 through the ISDN line 2-2 (step 11-13). As a result, the base station 3-2, when receiving an answer from the party of the call receiver, is put in a speech mode with the portable station 5 (steps 11-14 and 11-15), that is the portable station 5 can talk with the party through the idle slot of the T-CH.

The portable station 5, when failing to detect the T-CH being used as the result of the T-CH search or when detecting the T-CH being used but failing to detect an idle slot, performs its accessing operation with use of the C-CH (step 11-16).

Figure 12:
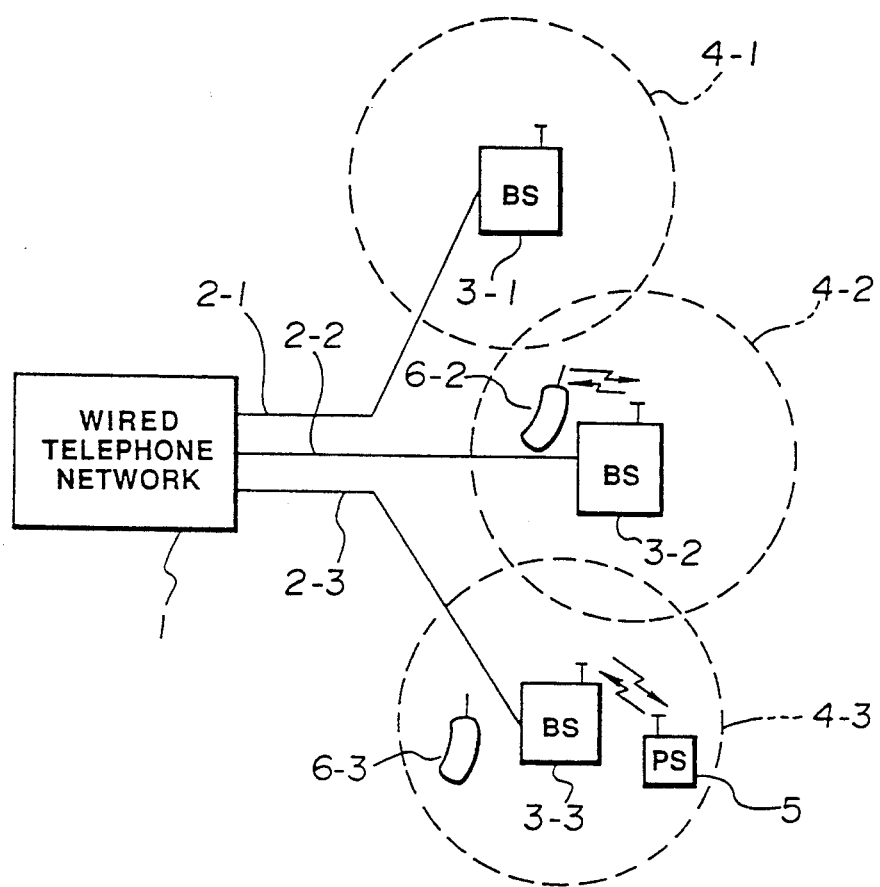
FIG. 12 is a configuration of the radio communication system when the portable radio telephone set is located in a spatial radio zone 4-3 in FIG. 1.

Such accessing operation with use of the C-CH is carried out, for example, when the portable station 5 is located in the spatial radio zone 5-3 and the branch unit 6-3 associated with the base station 3-3 is in its wait state as shown in FIG. 12. In this case, even when the branch unit 6-2 is talking with the party with use of the T-CH, the portable station 5 cannot detect the T-CH.

Figure 13:
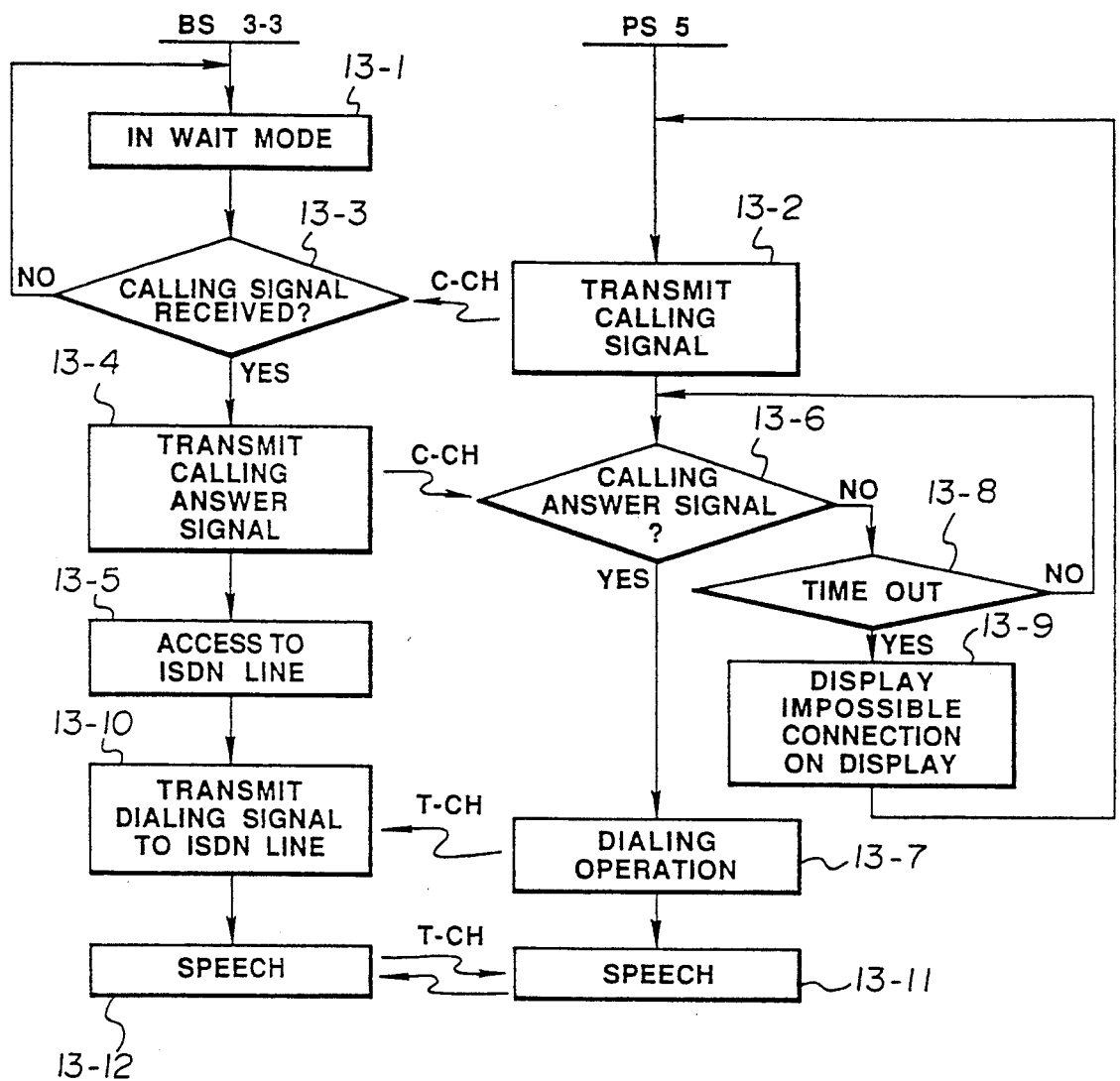
FIG. 13 is a flowchart for explaining the relative operation between the portable radio telephone set and a fixed station 3-3 in the configuration of FIG. 12.

This operation in the above case will be explained by referring to a flowchart of FIG. 13. In FIG. 13, the branch unit 6-3 to be exclusively connected with the base station 3-3 having the spatial radio zone 4-3 is in a wait mode with the C-CH (step 13-1). In this case, the portable station 5 transmits a calling signal with use of the C-CH (step 13-2).

Meanwhile, the base station 3-3 in the wait state, when receiving the calling signal from the portable station 5 (step 13-3), transmits a calling answer signal to the portable station 5 with use of the C-CH (step 13-3). At this time, the base station 3-3 transmits the calling answer signal including the designated T-CH and idle time slot to switch the current T-CH and time slot to the designated T-CH and time slot. The base station 3-3 accesses the ISDN line 2-3 to call the party connected to the other end of the wired telephone network 1 (step 13-5).

Meanwhile, the portable station 5, when receiving the calling answer signal from the base station 3-3 (step 13-6), switches to the designated T-CH and time slot and then transmits a dialing signal entered through a user's dialing operation with use of the switched T-CH and time slot (step 13-7). When failing to receive the calling answer signal in a predetermined time, the portable station 5 times out (step 13-8) and displays a message indicating a connection failure on the display (step 13-9).

The base station 3-3, when receiving the dialing signal issued from the portable station 5 in the step 13-7, transmits the dialing signal to the wired telephone network 1 through the ISDN line 2-3 (step 13-10). Thereafter, the base station 3-3, when receiving an answer from the party connected to the other end of the wired telephone network 1, is put in the speech mode together with the portable station 5 (steps 13-11 and 13-12).

Figure 14:
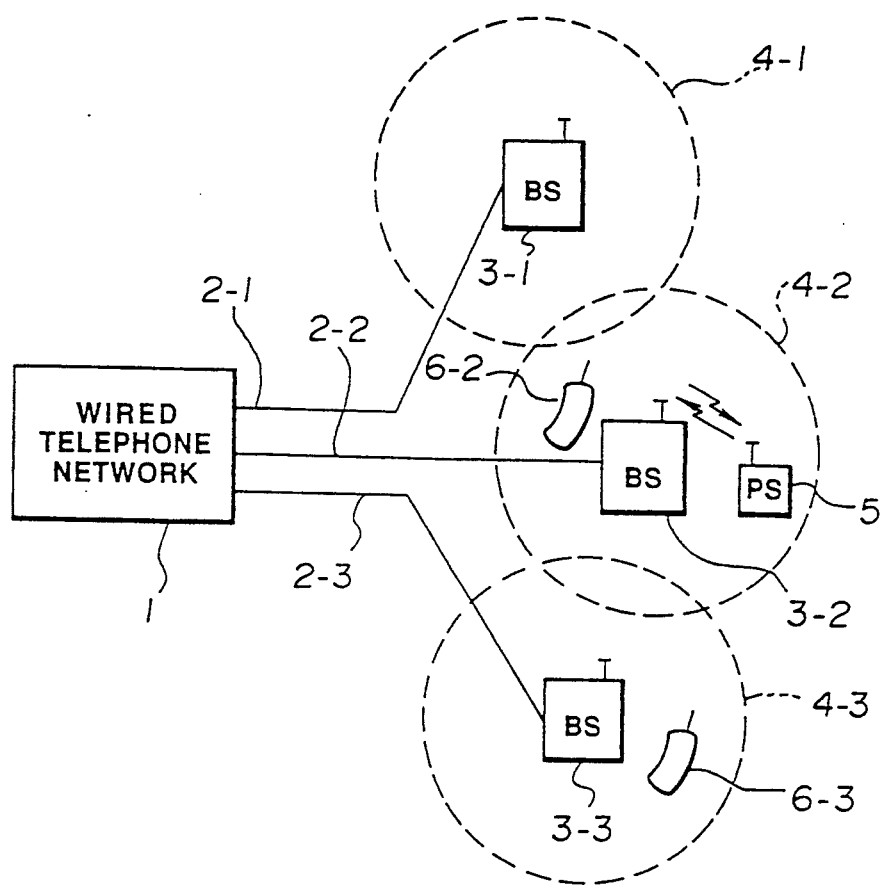
FIG. 14 is a configuration of the radio communication system when a specific branch unit within a spatial radio zone 4-2 in FIG. 1 is not in a communication mode.

Explanation will next be made as to the operations of the portable station 5 and the base station 3-2 when the portable station 5 is located within the spatial radio zone 4-2 and the branch unit 6-2 corresponding to the base station 3-2 is in a wait state as shown in FIG. 14, by referring to a flowchart of FIG. 15.

When the branch unit 6-2 to be exclusively connected to the base station 3-2 having the spatial radio zone 4-2 is in the wait state, the base station 3-2 is in the wait mode with the C-CH (step 15-1). Under such a condition, when the operator of the portable station 5 conducts a calling operation (step 15-2), this causes the portable station 5 to perform its T-CH searching operation (step 15-3) and then to judge the detection or nondetection of the T-CH being used (step 15-4). In this case, since the branch unit 6-2 associated with the base station 3-2 is not in the speech mode, the portable station 5 cannot detect the T-CH and thus transmits a calling signal with use of the C-CH (step 15-5).

Meanwhile, the base station 3-2 in the wait state with the C-CH receives the calling signal from the portable station 5 (step 15-6) and transmits to the portable station 5 a calling answer signal indicative of the reception of the calling signal with use of the C-CH (step 15-7). At this time, the base station 3-2 transmits the signal (calling answer signal) indicative of the designated T-CH and idle time slot and switches the current T-CH and time slot to the designated T-CH and time slot. The base station 3-2 also accesses the ISDN line 2-2 to call the party connected to the other end of the wired telephone network 1 (step 15-8).

The portable station 5, when receiving the calling answer signal from the base station 3-2 (step 15-9), switches to the designated T-CH and time slot and then transmits a dialing signal entered through user's dialing operation to the base station 3-2 with use of the switched T-CH. The portable station 5, when failing to receive the calling answer signal in a predetermined time, times out (step 15-11) and displays a message saying a connection failure on the display (step 15-12).

The base station 3-2, when receiving the dialing signal issued from portable station 5 in the step 15-10, transmits the dialing signal to the wired telephone network 1 through the ISDN line 2-2 (step 15-13). Thereafter, the base station 3-2, when receiving an answer from the party connected to the other end of the wired telephone network 1, is put in the speech mode together with the portable station 5 (steps 15-14 and 15-15).

Figure 16:
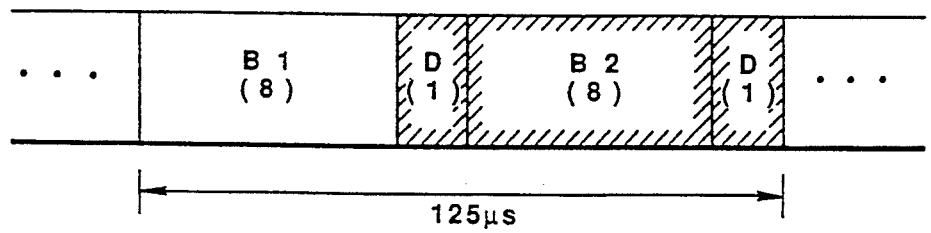
FIG. 16 is a diagram showing the use state of the digital channels between the fixed station and the wired telephone network in FIG. 15.

Shown in FIG. 16 is a diagram showing the channel use state of the ISDN line 2-2 between the base station 3-2 and the wired telephone network 1. In this case, since the branch unit 6-2 associated with the base station 3-2 is in the wait state, the channel B1 of the ISDN line 2-2 is not used. However, when the portable station 5 issues a calling signal, the portable station 5 uses the channel B2 of the ISDN line 2-2. In FIG. 16, hatched areas denote the channels being used.

Figure 15:
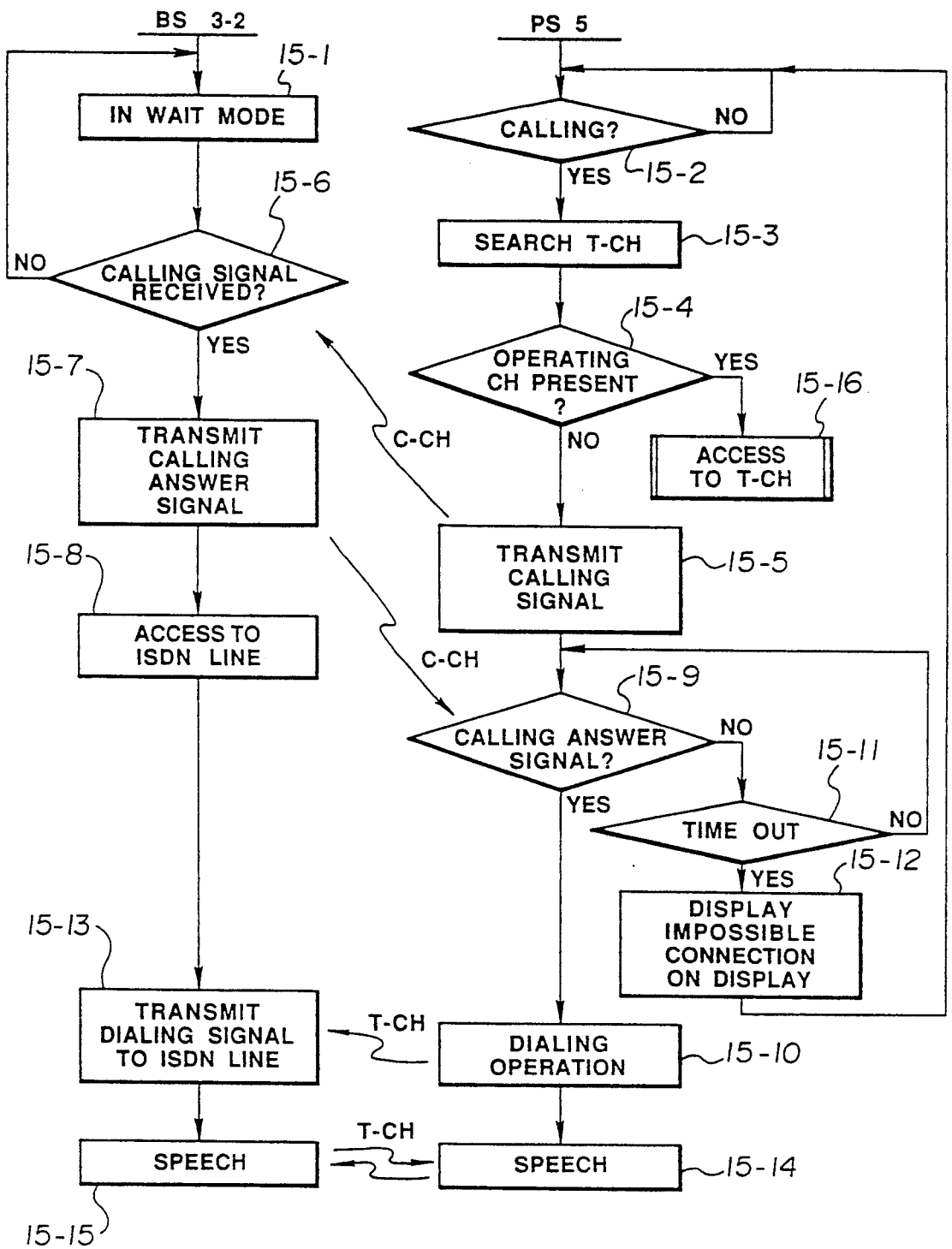
FIG. 15 is a flowchart for explaining the relative operation between the portable radio telephone set and the fixed station in the configuration of FIG. 14.

The portable station 5, when determining the presence of a channel being used in the step 15-4 of FIG. 15, performs its accessing operation with use of the channel being used (step 15-16). Such an operation is carried out, for example, when the portable station 5 is located within an overlapped area between the spatial radio zones 4-2 and 4-3 and the base station 3-3 is talking with the party with use of the T-CH being used. In this case, the portable station 5 is located in the radio zone 4-2 of the base station 3-2 but detects the T-CH being used by the base station 3-3. The then operation is shown in FIG. 17.

Figure 17:
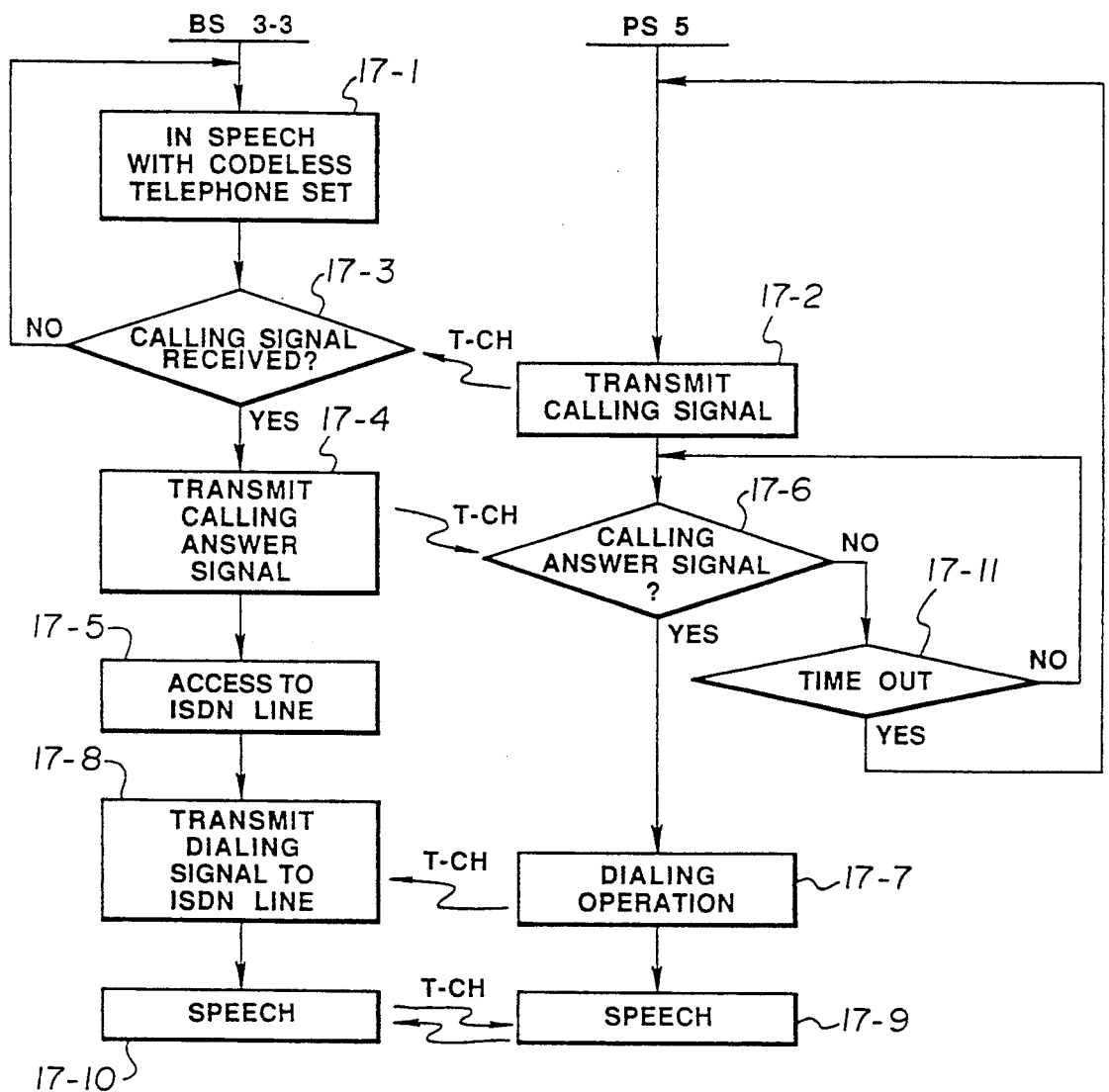
FIG. 17 is a flowchart for explaining the relative operation between a portable radio telephone set 5 and a fixed station 3-2 when the portable radio telephone set 5 is located within an overlapped area between spatial radio zones 4-2 and 4-3 in the configuration of FIG. 12.
Figure 18:
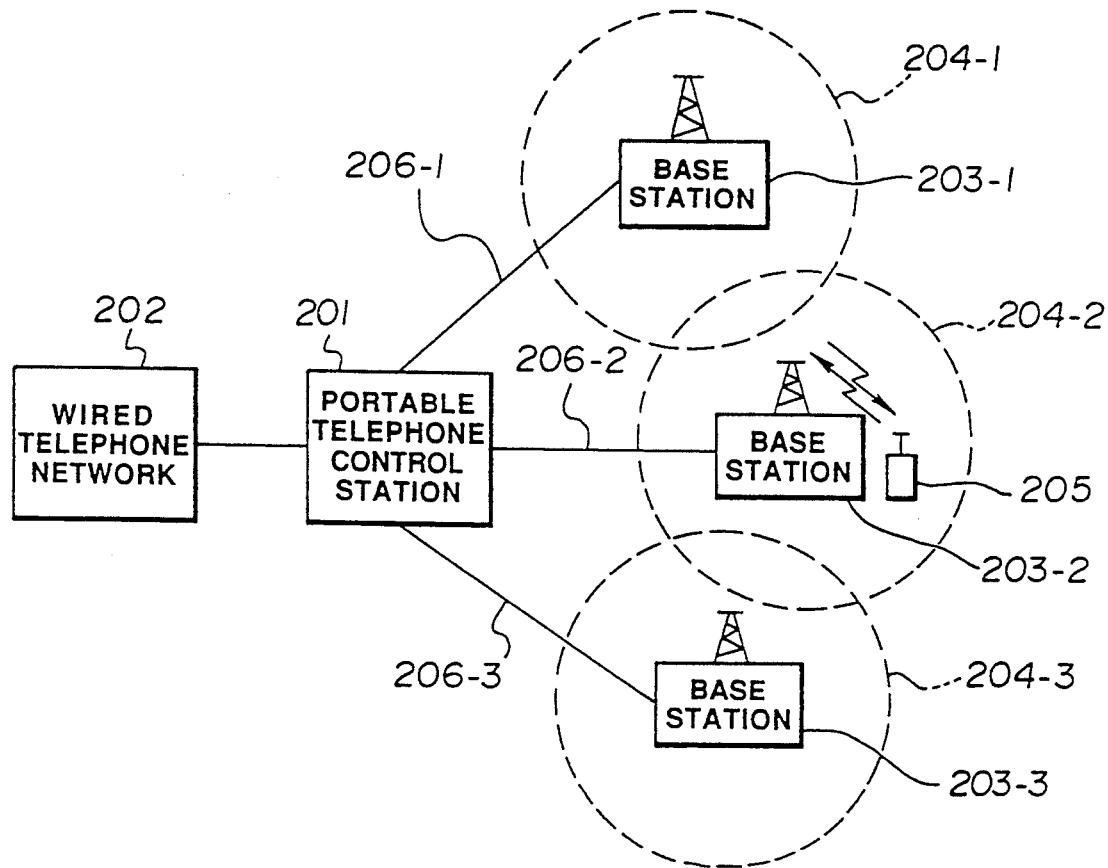
FIG. 18 is a configuration of a prior art portable radio telephone system.
Figure 19:
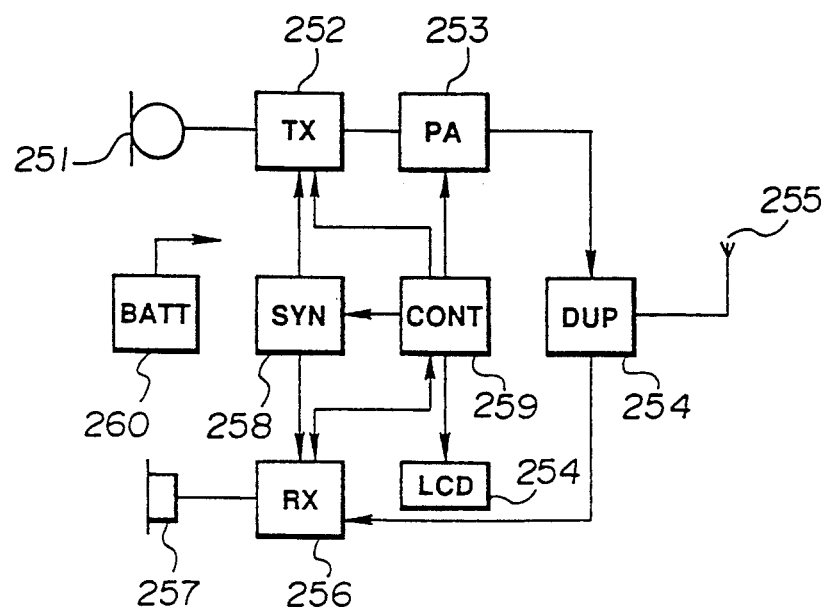
FIG. 19 is a block diagram of an arrangement of a portable radio telephone set in the prior art.
Figure 21:
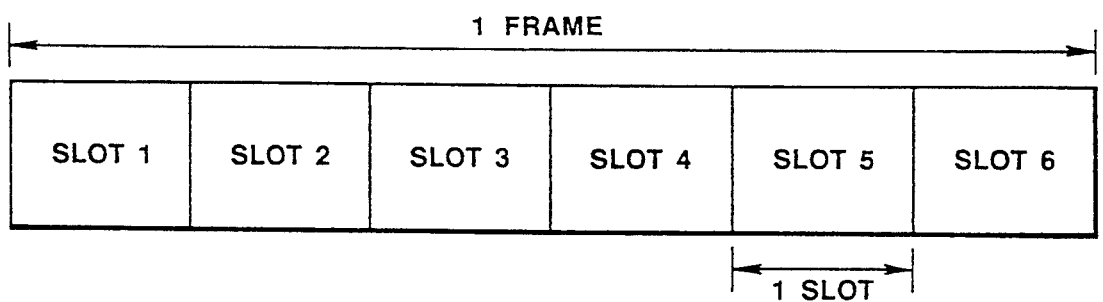
FIG. 21 shows a structure of a radio circuit frame in the prior art.
Figure 20:
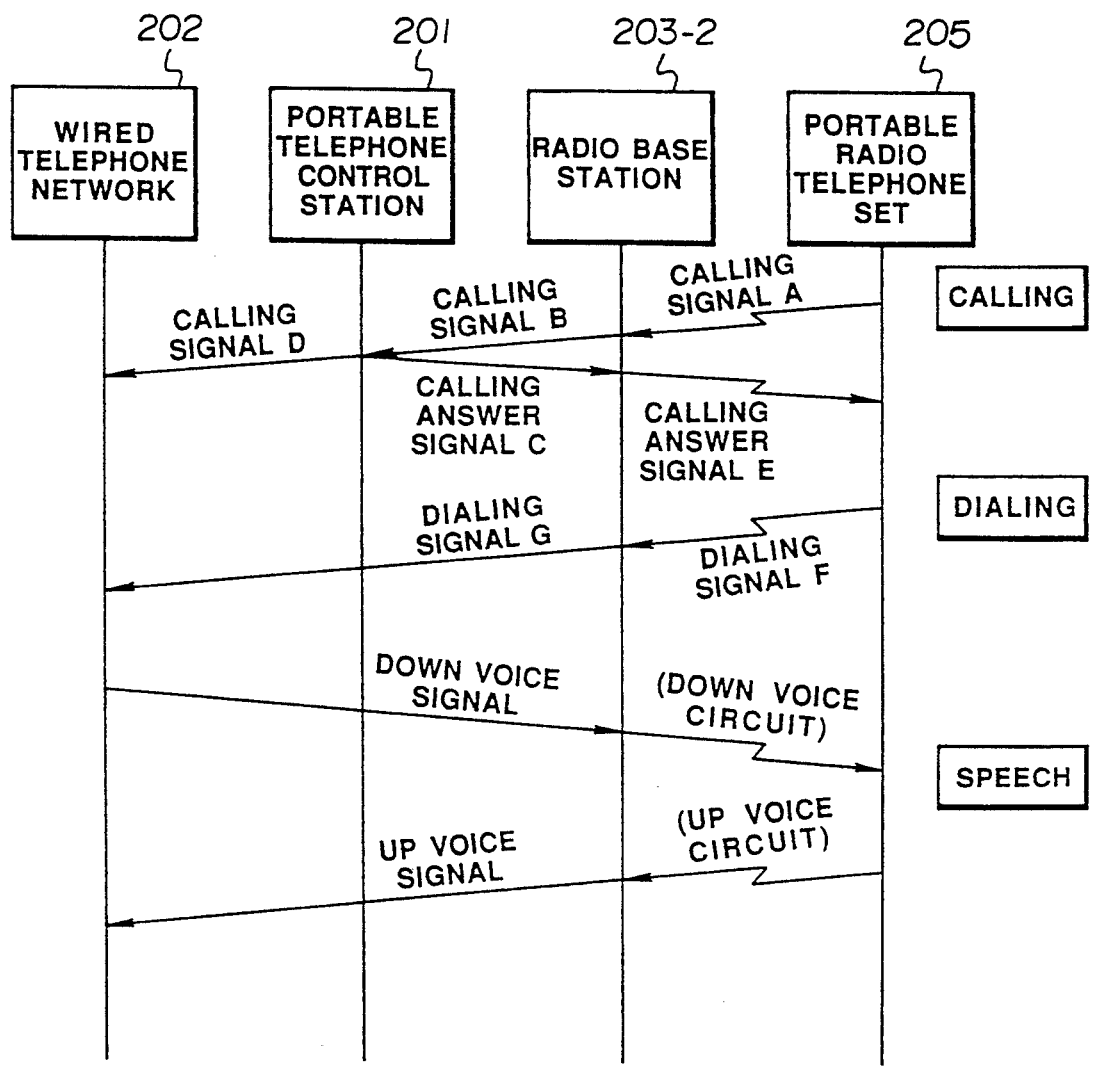
FIG. 20 is a sequential diagram for explaining the operation of the prior art.

In FIG. 17, the base station 3-3 having the spatial radio zone 4-3 is in the speech mode with the specific branch unit 6-3 of the base station 3-3 with use of the T-CH (step 17-1). Meanwhile, the portable station 5, which is located in the overlapped area between the radio zone 4-2 of the base station 3-2 and the radio zone 4-3 of the base station 3-3, transmits a calling signal to the base station 3-3 with use of the idle time slot of the T-CH being used by the base station 3-3 (step 17-2).

The base station 3-3, when there is an idle slot in the T-CH being used, also receives the idle slot. The base station 3-3, when receiving the calling signal from the portable station 5 (step 17-3), transmits a calling answer signal to the portable station 5 with use of the idle slot of the T-CH (step 17-4). Thereafter, the base station 3-3 accesses to the ISDN line 2-3 to transmit the calling signal to the wired telephone network 1 (step 17-5).

The portable station 5, after having transmitted the calling signal to the base station 3-3, waits for the calling answer signal. The portable station 5, when receiving the calling answer signal from the base station 3-3 (step 17-6), transmits a dialing signal entered through user's dialing operation to the base station 3-3 with use of the T-CH (step 17-7).

The base station 3-3, when receiving the dialing signal from the portable station 5, transmits the dialing signal to the wired telephone network 1 through the ISDN line 2-3 (step 17-8). In response to an answer from the call receiver connected to the other end of the wired telephone network 1, the base station 3-3 and the portable station 5 are both put in the speech mode (steps 17-9 and 17-10). As a result, the portable station 5 can talk with the party with use of the idle slot of the T-CH.

Meanwhile, in step 17-6, if the calling answer signal is not received by the portable station 5 within a predetermined time period, times the portable station station 5 out (17-11) and the process returns to step 17-2.

In this way, when the base station is in the speech mode but there is an idle slot, the portable station 5 can transmit a calling signal with use of the idle slot of the T-CH and the speech sequence is carried out with use of the T-CH. When the base station is in the speech state and all the time slots are occupied or when all the base stations are not used for speech, connection is initially effected with use of the C-CH as in the prior art and subsequently the channel and time slot are switched to the designated T-CH and time slot.

The operation of the present embodiment is realized when at least one of the two channels B of the ISDN line is secured for the portable station. Detection of an idle slot of an idle channel may be carried out by the base station or the portable station. Further, how to detect the idle slot may be arbitrarily carried out.

Although the above explanation has been made in connection with the embodiment of the present invention, the present invention may be arbitrarily modified in various ways. For example, the base station may be connected directly with another wired terminal. Also the base station itself may be a wired terminal having a transceiver built therein. In the latter case, the wired terminal does not have a branch unit which uses a spatial radio circuit. Accordingly, if only wired terminals having built-in transceivers are used as the base stations, it is sufficient enough for the base stations to establish a single spatial radio circuit as in the prior art.

Further, the base station may not be connected to the specific radio terminal like the base station 2 but it may be possible to include the base station installed exclusively for the portable station in the radio communication system. The installation of such base station enables to ensure wide service areas for portable stations.

The branch units 6-2 and 6-3 may function as branch units in their own radio zones and may function as the portable stations within the other radio zones.

Furthermore, how to use the time slots in the spatial radio circuit may be arbitrarily employed. For example, there may be employed such a TDD communication system that the transmit frequency is set to be equal to the receive frequency and only the time slot at the time of transmission is modified. In this connection, the TDD system requires at least 4 time slots.

The user of the base station can use the base station without noticing the fact that the base station is also used for the connection of the portable station. Further, the telephone fee charging can be handled in the wired telephone network.

Though the foregoing embodiment has been based on the portable station being used outdoors, the portable station may be similarly used indoors.

What is claimed is:

1. A radio communication system comprising:
  a plurality of fixed stations each having at least one branch unit and connected to a wired communication network through a digital line in which at least two communication channels are set; and
  at least one mobile transceiver for calling said wired communication network,
  wherein each of said fixed stations establishes a radio communication channel having a plurality of time division time slots, preferentially performs control over communication between one of said at least one branch unit and said wired communication network with use of one of said plurality of time division time slots and with use of one of said at least two communication channels, and also performs, when one of said at least one mobile transceiver calls said wired communications network, control over communication between said one of said at least one mobile transceiver and said wired communication network with use of an idle one of said plurality of time division time slots and with use of another one of said at least two communication channels.

2. A radio communication system as set forth in claim 1, wherein each of said plurality of fixed stations has means for establishing the radio communication channel with said branch unit in response to an incoming call from said wired communication network to said branch unit or in response to a calling signal from said branch unit to said wired communication network.

3. A radio communication system as set forth in claim 1, wherein each of said plurality of fixed stations includes:
  means, when receiving an access request from said mobile transceiver with use of the idle one of said plurality of time division time slots of the radio communication channel established with said branch unit, for accessing to said wired communication network with use of the other one of said at least two communication channels of the digital line, and
  means for transmitting a dialing signal transmitted from said mobile transceiver with use of said idle time slot to said wired communication network with use of the other one of said at least two communication channels.

4. A radio communication system as set forth in claim 1, wherein each of said plurality of fixed stations includes:
  means, when receiving an access request from said mobile transceiver during no establishment of the radio channel with said branch unit, for accepting said access request and accessing to said wired communication network with use of the other one of said at least two communication channels of the digital line,
  means for establishing a radio channel with said mobile transceiver in response to said access request from said mobile transceiver, and
  means for transmitting a dialing signal transmitted from said mobile transceiver with use of the idle time slot of said established radio communication channel to said wired communication network with use of the other one of said at least two communication channels.

5. A radio communication system as set forth in claim 1, wherein said mobile transceiver includes:
  first search means for searching for the radio communication channel established between said fixed station and said branch unit,
  second search means for searching for an idle time slot of the radio communication channel searched by said first search means, and
  means for accessing to said fixed station with use of the idle time slot searched by said second search means.

6. A radio communication system as set forth in claim 5, wherein, when said radio channel cannot be searched by said first search means or when said radio channel can be searched by said first search means but the idle time slot cannot be searched by said second search means, said mobile transceiver accesses to said fixed station with use of a control channel for establishment of the radio channel between said fixed station and said branch unit.

7. A radio communication system in which a mobile transceiver is disposed within areas where a plurality of fixed stations are disposed, each of said plurality of fixed stations having a branch unit and connected to a wired communication network through a digital line in which at least two communication channels are set, said fixed station establishing a radio communication channel with said branch unit for performing relay control over communication between said branch unit and said wired communication network with use of one of a plurality of time division time slots of the established radio communication channel and with use of specific one of said at least two communication channels, said mobile transceiver comprising:

means for searching for the radio communication channel established between said fixed station and the branch unit and for calling said wired communication network with use of idle one of the plurality of time division time slots of the searched radio communication channel and with use of the other one of said at least two communication channels of the digital line connected to the fixed station; and means, when the radio communication channel established between said fixed station and said branch unit cannot be searched, for accessing to adjacent one of the fixed stations not establishing the radio communication channel with the branch unit with use of a control channel to establish the radio communication channel between the adjacent fixed station and the branch unit and for calling said wired communication network with use of idle one of the time division time slots of the established radio communication channel and with use of the other one of said at least two communication channels of the digital line connected to said adjacent fixed station.

8. The radio communication system of claim 1, wherein said at least one branch unit communicates with said wired communication network solely through the fixed station associated therewith.

9. The radio communication system of claim 1, wherein at least one of said plurality of fixed stations is a private base station of a cordless telephone system through which public access to said wired communication network is allowed using said at least one mobile transceiver.

10. The radio communication system of claim 7, wherein said at least one branch unit communicates with said wired communication network solely through the fixed station associated therewith.

11. The radio communication system of claim 7, wherein at least one of said plurality of fixed stations is a private base station of a cordless telephone system through which public access to said wired communication network is allowed using said at least one mobile transceiver.

12. A radio communication system comprising:
at least one mobile transceiver; and
a plurality of fixed stations connected to a wired communication network through a digital line in which at least two communication channels are set and disposed within service areas of said mobile transceiver, wherein each of said fixed stations communicates with an associated branch unit and with said mobile transceiver through a radio communication channel with use of said radio communication channel on a time division basis, wherein said branch unit and said mobile transceiver access said wired communication network independently of each other with use of a different one of said at least two communication channels respectively, and wherein said branch unit communicates with said wired communication network solely through the fixed station associated therewith.

13. A radio communication system comprising:
at least one mobile transceiver; and
a plurality of fixed stations connected to a wired communication network through a digital line in which at least two communication channels are set and disposed within service areas of said mobile transceiver, wherein each of said fixed stations communicates with a branch unit connected to an associated fixed station and with said mobile transceiver through a radio communication channel with use of said radio communication channel on a time division basis, wherein said branch unit and said mobile transceiver access said wired communication network independently of each other with use of a different one of said at least two communication channels respectively, wherein at least one of said plurality of fixed stations is a private base station of a cordless telephone system through which public access to said wired communication network is allowed using said at least one mobile transceiver, wherein the branch unit associated with said private base station is a cordless telephone, and wherein one of said at least two communication channels is reserved for use by said cordless telephone.

* * * * *